United States Patent
Greubel

(10) Patent No.: US 7,096,595 B2
(45) Date of Patent: Aug. 29, 2006

(54) GUIDE WITH MEASURING DEVICE, AND METHOD WITH PRODUCING SUCH A GUIDE

(75) Inventor: Roland Greubel, Ramsthal (DE)

(73) Assignee: Rexroth Star GmbH, Schweinfurt (DE)

( * ) Notice: Subject to any disclaimer, the term of this patent is extended or adjusted under 35 U.S.C. 154(b) by 310 days.

(21) Appl. No.: 10/950,939

(22) Filed: Sep. 27, 2004

(65) Prior Publication Data

US 2005/0076526 A1 Apr. 14, 2005

(30) Foreign Application Priority Data

Oct. 11, 2003 (DE) .......................................... 103 47 360

(51) Int. Cl.
*G01B 21/00* (2006.01)

(52) U.S. Cl. ............................... 33/706; 33/707; 33/708

(58) Field of Classification Search ............ 33/706–708
See application file for complete search history.

(56) References Cited

U.S. PATENT DOCUMENTS

| | | | | |
|---|---|---|---|---|
| 6,769,195 | B1 * | 8/2004 | Huber et al. ................... | 33/706 |
| 6,826,847 | B1 * | 12/2004 | Wahl et al. ................... | 33/706 |
| 2004/0020067 | A1 * | 2/2004 | Matsumoto ................... | 33/706 |

OTHER PUBLICATIONS

Brochure RD 82 350/11.98 "Star–Ball and Roller Rail Guides . . . ", Rexroth Star, Nov. 1998., pp. 2–3.

* cited by examiner

*Primary Examiner*—Christopher W. Fulton
*Assistant Examiner*—Tania Courson

(57) ABSTRACT

A guide with a measuring device has a guide base with a longitudinal axis, a runner guided on the guide base in a direction of the longitudinal axis, a measuring device which measures a position of the runner in the direction of the longitudinal axis of the guide base or a condition of the guide base and having a measuring head arranged on the runner and connectable with an evaluating circuit for sensing the measuring guide, and an adapter plate arranged between the measuring head and the runner.

14 Claims, 2 Drawing Sheets

PRIOR ART

GUIDE WITH MEASURING DEVICE, AND METHOD WITH PRODUCING SUCH A GUIDE

BACKGROUND OF THE INVENTION

The present invention relates to a guide with a measuring device, as well as to a method of producing such a guide.

More particularly, the present invention relates to a guide with a measuring device, which includes a guide base with a longitudinal axis, a runner guided on the guide base in direction of the longitudinal axis, a position measuring device which measures the position of the runner in direction of the longitudinal axis of the guide base, and a measurement standard arranged on the guide base.

Such a linear guide with the measuring device is disclosed for example in the brochure RD 82 350/11.98 "STAR-ball and Roller Rail Guides with Integrated Measuring System" of the Company Rexroth Star GmbH (FIG. 2). The known linear guide with the integrated measuring system 10 is composed of a guiding rail 12 with a longitudinal axis A, on which a runner is supported longitudinally movable over not shown roller bearings.

The measuring system 20 is formed by a separate sensing element (measuring head) 22 and a measuring standard 24 integrated in the guiding rail. The measuring head mounted directly on the runner contains the sensing system and electronic system for the signal conditioning. The measuring standard, a steel partition with a high precision structure, is arranged in a groove of the guiding rail and protected by a stainless, tightly welded high-grade steel band.

The known linear guide with integrated measuring system has the disadvantage that due to the direct application of the measuring head on the runner, angular deviations due to tolerances can occur, which negatively influence the measuring results. Moreover, in the known system a high expenses for the adjustment of the sensor arranged in the measuring head take place.

In accordance with a second aspect, the present invention deals with a guide with a measuring device which includes a guide base with a longitudinal axis, a runner guided on the guide base in direction of the longitudinal axis, and a measuring device which measures the condition of the guide base with a measuring head arranged on the runner and connected with an evaluating device.

SUMMARY OF THE INVENTION

Accordingly, the objective of the invention is to provide a guide with the measuring device, which makes possible a simple and position-accurate mounting of the measuring head.

In accordance with the present invention, this objective is achieved in that an adapter plate is arranged between the measuring head and the runner.

With the adapter plate, and position-accurate positioning of the measuring head is guaranteed, which then guarantees a predetermined distance of the sensor to the guiding base when the measuring head is exchanged. Moreover, there is a possibility to support the runner and the measuring head separately, so that when necessary they can be assembled in a correct position without expensive adjustment steps.

The inventive guide includes a guide base and a runner which is longitudinally displaceable supported on the guide base in direction of its longitudinal axis. The guide can be formed as a linear or curved guide such as a sliding guide, a rolling guide, a fluid guide or a magnetic guide.

The guide base can be rectilinear or curved in form of a shaft, a spline shaft or a profile rail. A measuring standard is arranged on the guide base. Preferably, the measuring standard is arranged in a groove of the guide base and protected by a cover band from outer influences. It is however recommended to arrange the measuring standard outside on the guide base. Depending on the type of the guide, the runner can be formed as a sliding block, a carriage or a guiding car. On an end side of the runner which extends substantially orthogonal to the longitudinal axis of the guide base, an adapter plate is mounted. The measuring head is fixed on the adapter plate.

The measuring head is formed as a separate housing, in which at least one sensor is received. The sensor can be a directional sensor. In accordance with the second aspect of the invention, the sensor is a sensor for determination of the condition of the guide base, in particular for determination of the availability of a lubricant on the guide base.

Seals and cover arranged on the housing close the housing tightly, so that the measuring head can be formed as an assembly protected from outer influences, such as from dirt or cooling fluid.

The adapter plate has a positioning means, which correspond to the positioning counter means on the housing. The positioning means can be formed on the adapter plate as openings, and the positioning counter means on the housing can be formed as pins. It is also possible to form the positioning means on the adapter plate and the housing as openings, in which separate pins are introduced.

The positioning means on the adapter plate can be formed as elongated openings. Thereby a subsequent adjustment of the housing in a plane extending orthogonal to the longitudinal axis of the guide base is possible.

The adapter plate and the housing can be connected with one another by screws. For this purpose in both components corresponding mounting receptacles are provided, in which mounting means and mounting counter means can be received.

It is advantageous when the positioning-and mounting means are available in one of the components, the adapter plate of the housing, so that the positioning and mounting are simplified.

The inventive method for producing such a guide with a measuring device includes the steps of:

Mounting the adapter plate on the runner and placement of the runner on the guide base or on an auxiliary device, or vice versa;

plane treatment of the surface of the adapter plate extending orthogonal to the longitudinal axis of the guide base and facing away from the runner;

insertion of the positioning means into the plane-treated surface of the adapter plate, and mounting the measuring head on the adapter plate.

In accordance with this method, the runner is located on the guide base or on an auxiliary device. The adapter plate before or after the placement of the runner on the guide base or the auxiliary device, can be mounted by screws on the runner.

When the runner is located on the guide base or the auxiliary device and the adapter plate is located on the runner, a plane treatment of the surface of the adapter plate which extends orthogonal to the longitudinal axis of the guide base and faces away from the runner is performed. With this plane treatment, a plane milling can be used.

After the plane treatment, positioning means can be introduced in the plane-treated surface of the adapter plate. Advantageously, they are formed as openings or longitudinal openings.

Furthermore, the housing is provided with positioning counter means, which can be connected of one piece with the housing or can be formed as pins introduced in the housing, so that the housing can be plugged directly on the adapter plate.

In case when the positioning means of the adapter plate are formed as elongated holes, an additional adjustment of the measuring head is possible, and in particular in a plane which extends orthogonal to the longitudinal axis of the guide base. For this purpose in a first step a reference part, for example a ball or a pin, can be introduced in a longitudinal opening of the adapter plate. Subsequently the plugging of the housing is performed. With a mounting means screwable preferably orthogonal to the longitudinal axis of the guide base, a positioning counter means of the housing is pressed on the reference part. In this condition a measurement of the position of the measuring head relative to the guide base is performed. When a correction of this position is needed, the reference part is exchanged by a part with required dimensions.

In the last step the mounting of the measuring head and the adapter plate is performed by means of the mounting means and counter mounting means provided for this purpose.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
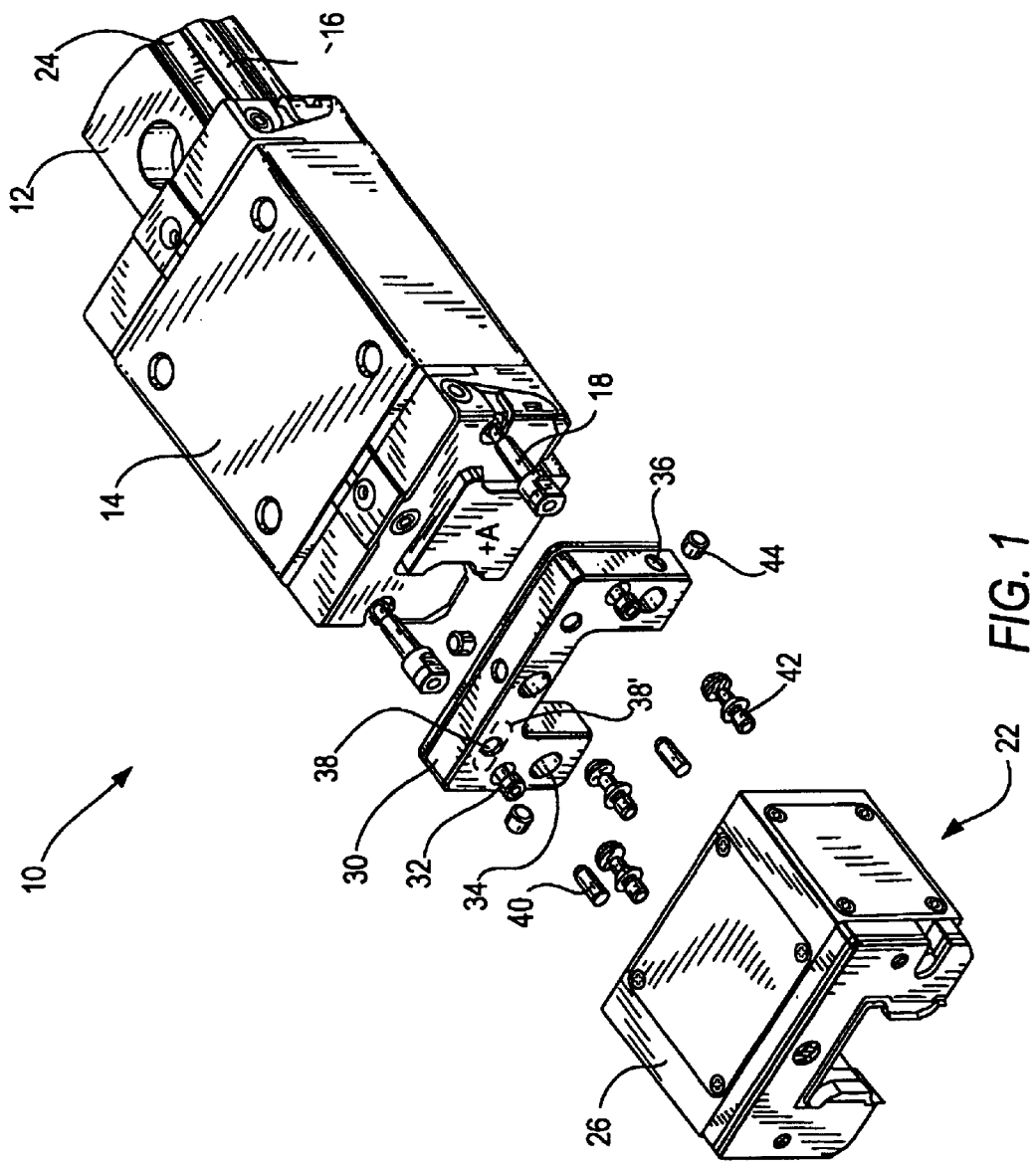
FIG. 1 is a view schematically showing a guide with a measuring device in accordance with the present invention.
Figure 2:
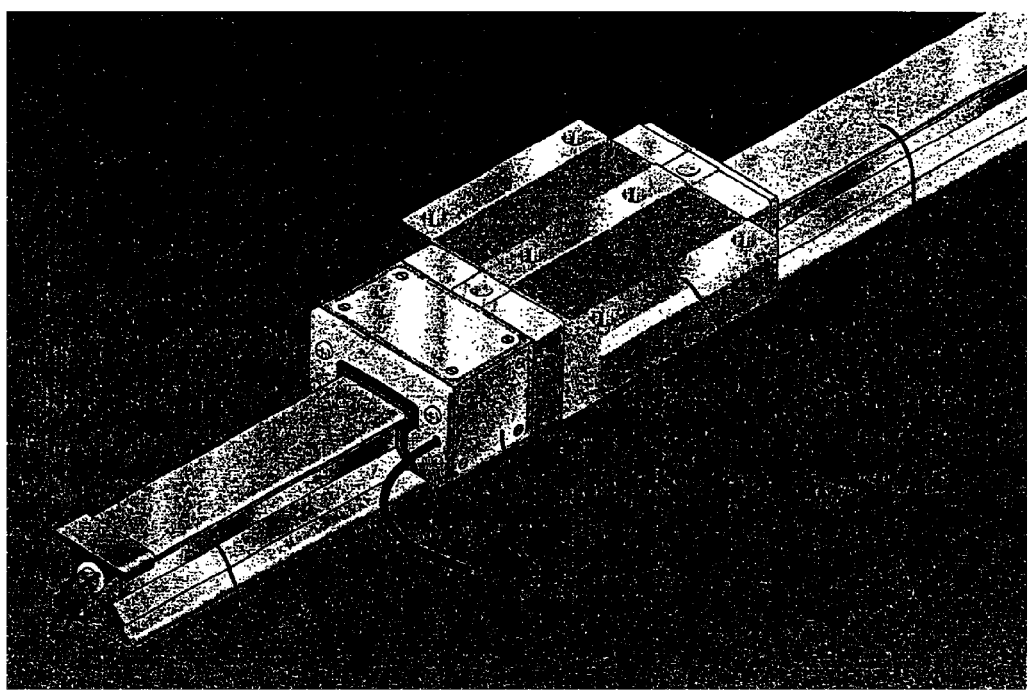
FIG. 2 is Prior Art.

FIG. 1 shows a linear guide in accordance with the present invention which is identified as a whole with reference numeral 10. The linear guide 10 is a ball-rail guide with a guide rail 12 and a guide car 14, on which a measuring head 22 is mounted.

The guide rail 12 has a longitudinal axis A. Running tracks 16 for not shown balls are provided on both side surfaces of the rail extending in a longitudinal direction. A measuring standard 24 is arranged in the rail side surface between the ball running tracks 16 and extends over the total axial length of the rail 12. The measuring standard 24 is tightly welded by a cover band.

The guide carriage 14 is composed of a substantially U-shaped main body and two end plates which are mounted on its end sides by screws 18. Supporting running tracks for the balls are made in the main body and correspond to the rail-side running tracks 16. In the main body, ball return tracks are arranged and formed as openings, which together with the supporting running tracks and the deviating tracks located in the end plates provide an enclosed ball circulation.

An adapter plate 30 is mounted on an end plate of the car 14. In this embodiment the mounting screws 18 of the end plate have a screw head with an inner thread, in which mounting screws 32 of the adapter plate 30 can be screwed. For providing centering of the adapter plate 30, the mounting screws 13 are provided with a centering head which in the screwed condition extends axially over the end plate, in order to assemble with a corresponding centering recess in the adapter plate 30.

Moreover receiving openings 34 are provided in the adapter plate 30, as well as transverse openings 36, and positioning openings 38.

While the openings 34 and 36 are provided for receiving the mounting means, such as anchors 42 or threaded pins 44, the positioning openings 38 serve for receiving of positioning counter means, such as pins 40.

The positioning openings 38 can be also formed as elongated holes 38' which are shown by a broken line in the drawing.

The measuring head 22 is composed substantially of a housing 28, in which a sensing system and an electronic system are accommodated. Various seals and covers can close the housing 20 to form a tight assembly protected from outer influences. Openings for the pins 40 and the anchors 42 are provided on the housing 26.

The method for producing an inventive linear guide with a measuring device will be described hereinbelow.

Both the linear guide with the guiding rail 12 and the guiding car 14 as well as the measuring head 22 are completely prefabricated components, such as for example located on the bearing. There is the advantage that on the measuring head 22, the pins 40 and the anchors 42 are already arranged.

The adapter plate 30, which can be composed of an aluminum alloy, has up to the positioning openings 38, all openings required for mounting of the end plate and for receiving the measuring head 22. Also, the adapter plate 30 can be formed as a prefabricated assembly located on the bearing.

The guide car 14 is placed on the guide rail 12. Before or after the placement of the car 14, the adapter plate 30 is mounted by screws 32 on the car 14.

On the thusly mounted linear guide, a plane milling of the adapter plate 30 is performed, so that the plane-treated surface forms a plane extending exactly orthogonal to the longitudinal axis A of the guide rail 12.

Then the complete measuring head 22 is mounted on the adapter plate 30, in that the pins 14 and the anchors 42 are introduced into the positioning opening 38 or the receiving openings 34 provided for measurement. BY turning of the threaded pins 40 into the transverse opening 38, finally a position-accurate mounting of the measuring head 22 on the adapter head 30 is performed.

In the case when it is desired to provide a post adjustment, in the adapter plate 30 instead of the positioning openings 38, elongated openings 38' are arranged. In these longitudinal openings, the pins 40 mounted on the measuring head can be displaced by a not shown adjustment means. Instead of the positioning openings 38, elongated holes 38' can be arranged, in which the pins 40 mounted on the measuring head can be displaced by means of a not shown adjusting means. For this purpose in a first step a reference ball with known dimensions is inserted in an elongated hole 38', on which a pin 40 is pressed. After the determination of the position of the measuring head 22 with respect to the guide rail 12, the measuring head 22 is screwed with the adapter plate 30. If the desired position of the measuring head 20 can be not be obtained, the reference ball is exchanged.

It will be understood that each of the elements described above, or two or more together, may also find a useful application in other types of constructions and methods differing from the types described above.

While the invention has been illustrated and described as embodied in guide for measuring device, and method with producing such a guide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A guide with a measuring device, comprising a guide base with a longitudinal axis; a runner guided on said guide base in a direction of said longitudinal axis; a measuring device which measures a position of said runner in the direction of the longitudinal axis of the guide base or a condition of the guide base and having a measuring head arranged on said runner and connectable with an evaluating circuit for sensing the measuring guide; and an adapter plate arranged between said measuring head and said runner.

2. A guide as defined in claim 1, wherein said adapter plate is arranged on a side of said runner which extends orthogonal to the longitudinal axis of said guide base and has a surface which forms a plane extending exactly orthogonal to the longitudinal axis.

3. A guide as defined in claim 1, wherein said adapter plate is screwed with said runner.

4. A guide as defined in claim 1, wherein said measuring head is formed as a separate housing with at least one sensor which is releasably connectable with said adapter plate.

5. A guide as defined in claim 4, wherein said measuring head is adjustably arranged on said adapter plate in a plane extending orthogonal to said longitudinal axis.

6. A guide as defined in claim 1, wherein said adapter plate has a positioning means which are bringable in engagement with a counter positioning means of said housing.

7. A guide as defined in claim 6, wherein said positioning means is formed as openings or longitudinal holes on said adapter plate, while said counter positioning means of said housing is formed as pins.

8. A guide as defined in claim 1, wherein said adapter plate and said housing has a mounting opening in which mounting means are insertable or screwable in for connecting of said adapter plate and said housing.

9. A method for producing a guide with a measuring device having a guide base with a longitudinal axis, a runner guided on the guide base in a direction of the longitudinal axis, a measuring device for measuring a position of the runner in the direction of the longitudinal axis of the guide base or a condition of the guide base and having a runner and a measuring head connected with an evaluating circuit for scanning the guide base, said method comprising the steps of mounting an adapter plate on the runner and placing the runner on the guide base or on the auxiliary device or vice versa; plane treating of a surface of the adapter plate which extends orthogonal to the longitudinal axis of the guide base and faces away from the runner; introducing positioning means in a plane-treated surface of the adapter plate; and mounting the measuring head on the adapter plate.

10. A method as defined in claim 9; and further comprising performing the mounting of the adapter plate by mounting screws insertable in screw heads of mounting screws for an end plate.

11. A method as defined in claim 9; and further comprising performing the plane treatment of the adapter plate by a plane milling.

12. A method as defined in claim 9; and further comprising performing the mounting of the measuring head of the adapter plate so that positioning counter means arranged on the measuring head are introduced into positioning means, for final introduction of the mounting means in mounting openings of the measuring head in a position-correct manner.

13. A method as defined in claim 12; and further comprising introducing the mounting means into the adapter plate parallel to a plane extending orthogonal to the longitudinal axis.

14. A method as defined in claim 12; and further comprising displacing positioning counter means connected with the measuring head and arranged in the positioning means before a final fixing of the measuring head on the adapter plate with use of an adjusting means in a plane extending orthogonal to the longitudinal axis of the guide base.

* * * * *